(12) United States Patent
Koizumi et al.

(10) Patent No.: US 8,485,704 B2
(45) Date of Patent: Jul. 16, 2013

(54) LAMP UNIT AND VEHICLE LAMP

(75) Inventors: Hiroya Koizumi, Shizuoka (JP); Asami Nakada, Shizuoka (JP); Kazunori Natsume, Shizuoka (JP)

(73) Assignee: Koito Manufacturing Co., Ltd., Minato-ku, Tokyo (JP)

( * ) Notice: Subject to any disclaimer, the term of this patent is extended or adjusted under 35 U.S.C. 154(b) by 376 days.

(21) Appl. No.: 12/885,802

(22) Filed: Sep. 20, 2010

(65) Prior Publication Data

US 2011/0085344 A1 Apr. 14, 2011

(30) Foreign Application Priority Data

Oct. 14, 2009 (JP) .................................. 2009-237619
Oct. 14, 2009 (JP) .................................. 2009-237620

(51) Int. Cl.
*F21V 7/00* (2006.01)
*F21V 11/00* (2006.01)

(52) U.S. Cl.
USPC ............ 362/511; 362/509; 362/555; 362/616

(58) Field of Classification Search
USPC ......... 362/511, 551, 555, 616, 628, 543–545, 362/516, 509, 538, 602–605
See application file for complete search history.

(56) References Cited

U.S. PATENT DOCUMENTS

| 5,921,671 A * | 7/1999 | Okuchi et al. ................ 362/511 |
| 7,160,010 B1 * | 1/2007 | Chinniah et al. .............. 362/511 |
| 7,290,906 B2 * | 11/2007 | Suzuki et al. ................. 362/511 |
| 7,695,175 B2 * | 4/2010 | Futami ........................... 362/511 |

FOREIGN PATENT DOCUMENTS

JP 2006-236588 9/2006

* cited by examiner

*Primary Examiner* — Bao Q Truong
(74) *Attorney, Agent, or Firm* — Fish & Richardson P.C.

(57) ABSTRACT

A lamp unit includes at least one light source that emits light in a predetermined direction, and a light guide body including at least one incident surface where light emitted from the light source enters, a first emission surface that emits light entering from the incident surface in a horizontal direction, and a plurality of second emission surfaces that emits light entering the incident surface in a horizontal direction and emits light entering the incident surface to the upper side of the horizontal direction. The second emission surfaces are formed above the first emission surface at different positions in an up-down direction, and are positioned on the back side of the first emission surface so as to be spaced apart from one another in the horizontal direction.

12 Claims, 7 Drawing Sheets

LAMP UNIT AND VEHICLE LAMP

This application claims priorities to Japanese Patent Application No. 2009-237619, filed Oct. 14, 2009, and Japanese Patent Application No. 2009-237620, filed Oct. 14, 2009. The disclosures of Japanese Patent Applications Nos. 2009-237619 and 2009-237620 are incorporated by reference in their entirety.

TECHNICAL FIELD

The present disclosure relates to a lamp unit and a vehicle lamp. More particularly, the present disclosure relates to techniques for improving safety by controlling an emission direction by using a light guide body that includes a first emission surface for emitting light in a horizontal direction and a plurality of second emission surfaces for emitting light in a horizontal direction and emitting light to the upper side of the horizontal direction.

RELATED ART

Some vehicle lamps have a lamp unit including a light source disposed in a lamp casing formed of a cover and a lamp housing. As the lamp unit, there are various types of lamps, such as a headlamp that irradiates a road surface in a traveling direction while a vehicle is traveling, and a clearance lamp that functions as a sidelight.

The lamp unit of the vehicle lamp, for example, functions as a clearance lamp and uses a light guide body. The light guide body guides light, which is emitted from a light source, in a predetermined direction therein, and emits the light to the outside (see, e.g., Japanese patent document JP-A-2006-236588).

The lamp unit of the vehicle lamp disclosed in JP-A-2006-236588 substantially forward-emits light, which is emitted from the light source and enters the light guide body, from a first emission surface of the light guide body and substantially upward-emits the light from a second emission surface of the light guide body by transmitting or internally reflecting the light.

In the lamp unit of the vehicle lamp disclosed in JP-A-2006-236588, light emitted from the light source is emitted substantially forward from the first emission surface and is emitted upward on the road from the second emission surface. Accordingly, when viewing the lamp unit from the front side of the lamp unit, pedestrians see only light that is emitted substantially forward.

Accordingly, when viewing the lamp unit on the front side of the lamp unit, pedestrians are in visual contact with only the light emitted from the first emission surface and cannot be in visual contact with the light emitted from the second emission surface. Therefore, the light emitting area for emitting light to the front side is small, so that visibility to pedestrian is low and safety deteriorates.

Further, when viewing the lamp unit on the upper side of the lamp unit, pedestrians may be in visual contact with light that is emitted substantially upward from the second emission surface. However, the light, which is to be emitted substantially upward from the second emission surface, is diffused to the entire second emission surface in the light guide body and is emitted.

Therefore, the amount of light emitted from the second emission surface per unit area is small, so that visibility to pedestrians is also low and safety deteriorates.

SUMMARY

Various aspects of the invention relate to a vehicle lamp that improves safety.

In order to address the problem discussed above, a lamp unit according to one aspect of the invention includes at least one light source arranged to emit light in a predetermined direction, and a light guide body. The light body includes at least one incident surface where light emitted from the light source enters, a first emission surface that emits light entering from the incident surface in a horizontal direction, and a plurality of second emission surfaces that emit light entering from the incident surface in a horizontal direction and emit light entering from the incident surface to an upper side of the horizontal direction. The second emission surfaces are above the first emission surface at different positions in an up-down direction, and are on a rear side of the first emission surface so as to be spaced apart from one another in the horizontal direction.

Further, to address the foregoing problem, according to another aspect, a vehicle lamp includes a lamp casing including a lamp housing of which one side is opened and a cover which closes an opening of the lamp housing, a first lamp unit, and a second lamp unit positioned below the first lamp unit. The first lamp unit and the second lamp unit are disposed in the lamp casing. The second lamp unit includes at least one light source arranged to emit light in a predetermined direction, and a light guide body as described above.

Accordingly, in the disclosed lamp unit, as well as in and a vehicle lamp including the lamp unit, light is emitted in the horizontal direction from the first emission surface and the plurality of second emission surfaces, and light is emitted from the plurality of second emission surfaces in the horizontal direction and is emitted from the plurality of second emission surfaces to the upper side of the horizontal direction.

According to one aspect, a lamp unit according to the present invention includes at least one light source arranged to emit light in a predetermined direction, and a light guide body as described above.

Accordingly, when viewing the lamp unit in the horizontal direction, pedestrians may be in visual contact with light that is emitted in the horizontal direction from the first emission surface and the second emission surfaces. Accordingly, a large light emitting area is secured by both the first emission surface and the second emission surfaces, so that visibility to pedestrians is high and safety may be improved.

In a further aspect of the invention, a first light source and a second light source are the at least one light source. A first incident surface where light emitted from the first light source enters and a second incident surface where light emitted from the second light source enters are the at least one incident surface of the light guide body. The light guide body includes a first reflecting surface for internally reflecting light, which enters the light guide body from the first incident surface, and for guiding the light to the first emission surface. The light body also includes a second reflecting surface for internally reflecting light, which enters from the second incident surface, and for guiding the light to the plurality of second emission surfaces. Accordingly, it is possible in some cases to guide light efficiently to a necessary position even by a small light source, so that it is possible to improve light use efficiency.

In another aspect, the first reflecting surface is at a position on a rear side of the second reflecting surfaces, light emitted from the first light source is reflected in the horizontal direction by the first reflecting surface and is guided to the first emission surface, and light emitted from the second light source is reflected in the horizontal direction by the second reflecting surfaces and is guided to the plurality of second emission surfaces.

Accordingly, it is possible in some cases to reduce the thickness of the light guide body, so that it is possible to reduce the sizes of the light guide body and the lamp unit including the light guide body.

In yet another aspect, each of the second emission surfaces has an annular shape that has a center at the second reflecting surface, or forms a part of an annular shape.

Accordingly, it is possible in some cases to emit light, which is emitted from the second light source, over a wide range in a desired direction and improve light use efficiency.

In a further aspect, the light guide body includes a first light guide member that guides light emitted from the first light source and a second light guide member that guides light emitted from the second light source. The second incident surface is at the first light guide member or the second light guide member. The first incident surface, the first reflecting surface, and the first emission surface are at the first light guide member. The second reflecting surfaces and the plurality of second emission surfaces are at the second light guide member.

Accordingly, the thickness of each of the light guide members can be smaller than that of the light guide body, which is integrally formed as a whole. Therefore, it can be possible to reduce molding time significantly.

According to another aspect, a vehicle lamp according to the present invention includes a lamp casing including a lamp housing of which one side is opened and a cover which closes an opening of the lamp housing. The vehicle lamp also includes a first lamp unit and a second lamp unit positioned below the first lamp unit. The first lamp unit and the second lamp unit are disposed in the lamp casing. The second lamp unit includes at least one light source arranged to emit light in a predetermined direction, and a light guide body as described above.

Accordingly, when viewing the lamp unit in the horizontal direction, pedestrians may be in visual contact with light that is emitted in the horizontal direction from the first emission surface and the second emission surfaces. Accordingly, a large light emitting area is secured by both the first emission surface and the second emission surfaces, so that visibility to pedestrians is high and safety may be improved.

In a further aspect, a first light source and a second light source are the at least one light source. A first incident surface where light emitted from the first light source enters and a second incident surface where light emitted from the second light source enters are the at least one incident surface of the light guide body. The light guide body includes a first reflecting surface for internally reflecting light, which enters the light guide body from the first incident surface, and for guiding the light to the first emission surface, and second reflecting surfaces for internally reflecting light, which enters from the second incident surface, and for guiding the light to the plurality of second emission surfaces.

Accordingly, it is possible in some cases to guide light to efficiently a necessary position even by a small light source, so that it is possible to improve light use efficiency.

In another aspect, the light guide body is disposed so that the first emission surface is positioned along an inner surface of the cover.

Accordingly, it is possible in some cases to emit the light, which is emitted from the first light source, in the shape of a band corresponding to the shape of the cover and to improve visibility to pedestrians further.

In another aspect, the first lamp unit is a headlamp functioning as a headlight, and the second lamp unit is a clearance lamp functioning as a sidelight.

Accordingly, it is possible in some cases to place the first and second lamp units so that the light distribution of the first lamp unit does not interfere with that of the second lamp unit.

Other aspects, features and advantages will be apparent from the following detailed description, the accompanying drawings and the claims.

DETAILED DESCRIPTION

Examples of the invention are described below with reference to the accompanying drawings.

In the following paragraphs, a vehicle lamp is described with two lamp units of a headlamp functioning as a headlight and a clearance lamp functioning as a sidelight. The lamp unit is not limited to a headlamp and a clearance lamp, and may be other lamp units such as a turn signal lamp, a daytime running lamp, and the like.

Vehicle lamps 1 are disposed and mounted on both left and right end portions of a front end portion, for example, of a vehicle body.

Figure 1:
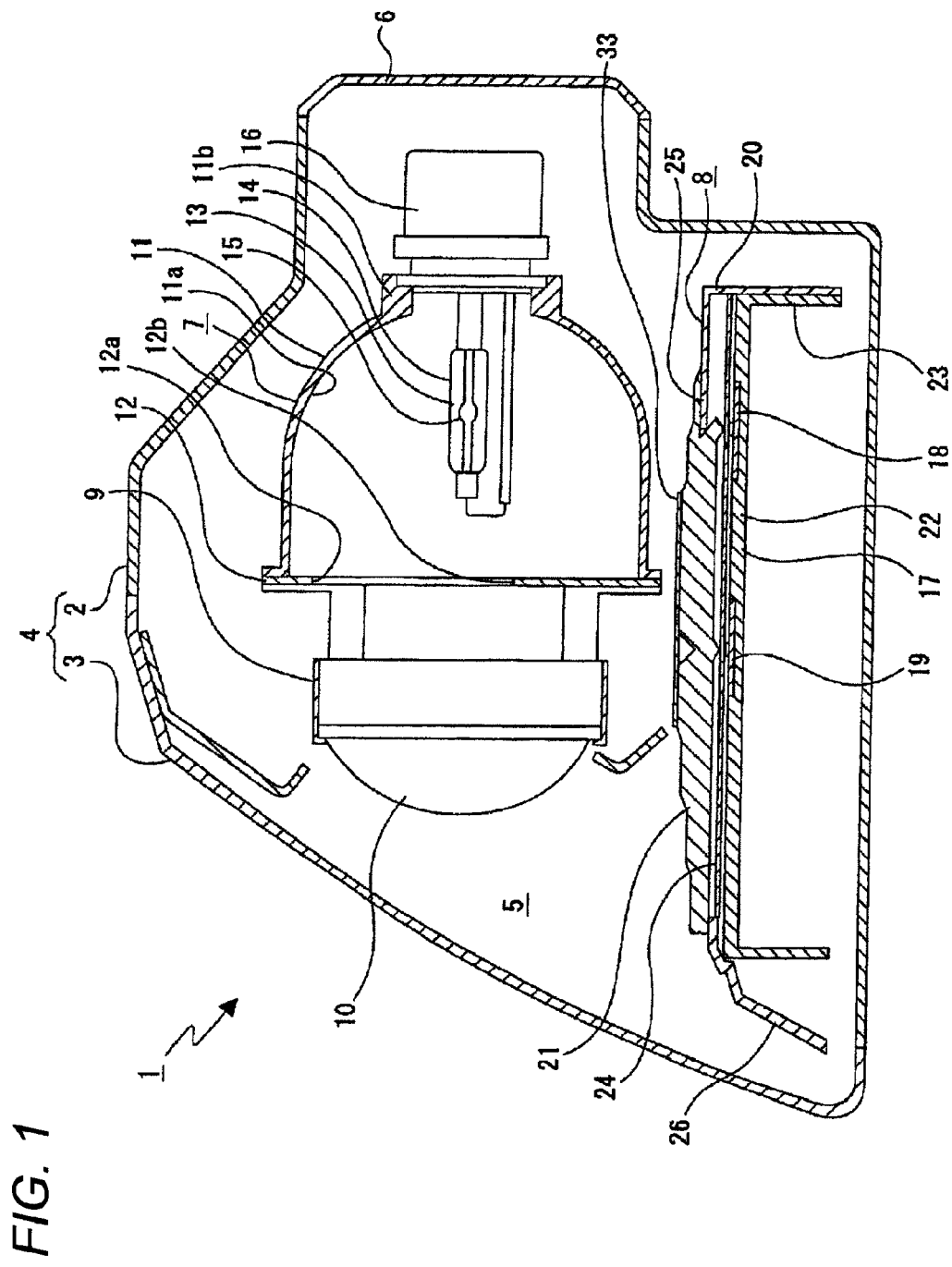
FIG. 1 is a schematic longitudinal sectional view of vehicle lamp.

As shown in FIG. 1, the vehicle lamp 1 includes a lamp housing 2 and a transparent cover 3. The lamp housing 2 includes a recess that is opened toward the front side, and the transparent cover 3 closes the opening of the lamp housing 2. A lamp casing 4 is formed of the lamp housing 2 and the cover 3, and an inner space of the lamp casing 4 is formed as a lamp chamber 5.

A mounting hole 2*a*, which passes through the lamp housing in a front-rear direction, is formed at a rear end portion of the lamp housing 2. A back cover 6, which closes the mounting hole 2*a*, is mounted on the rear end portion of the lamp housing 2.

Figure 2:
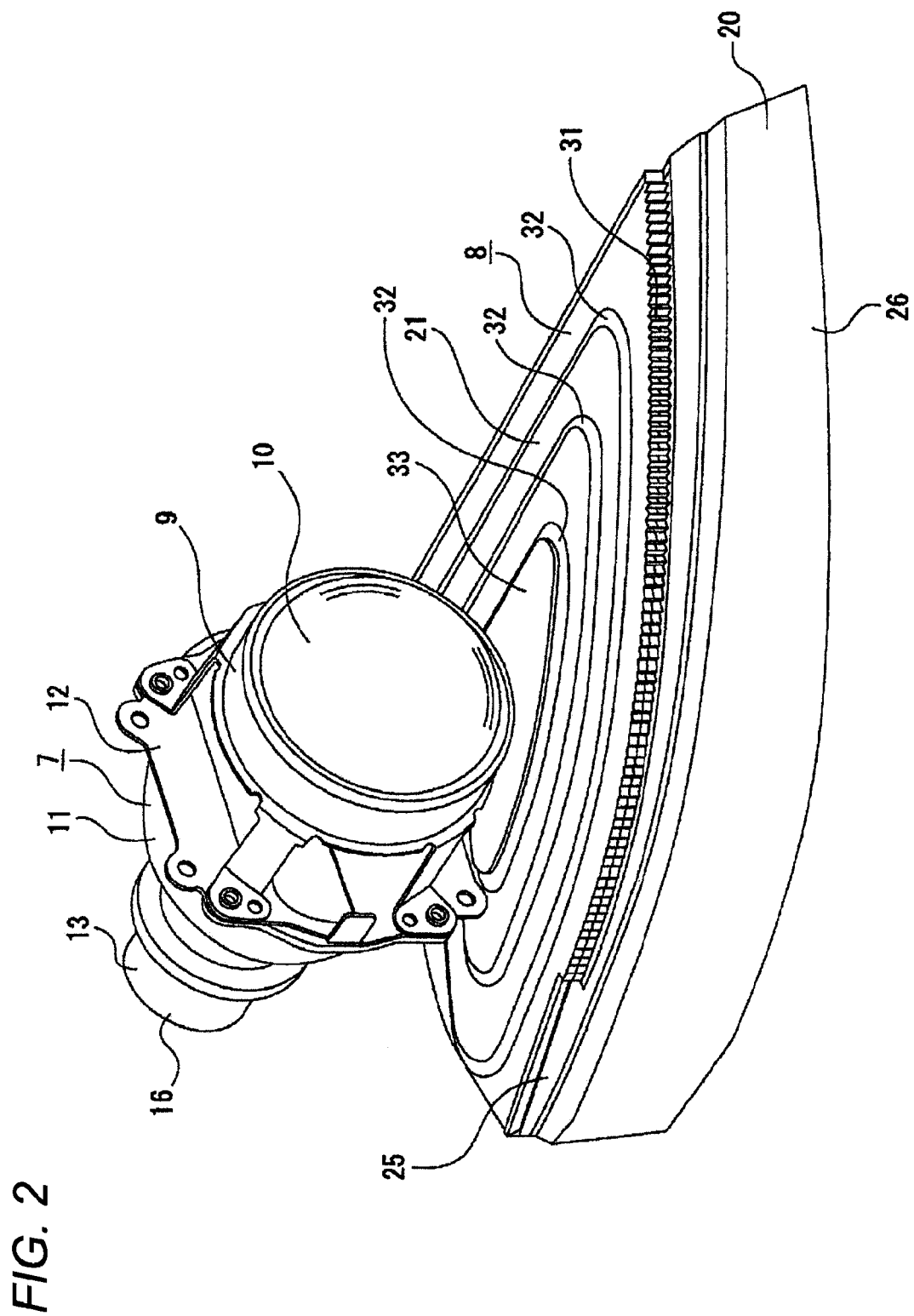
FIG. 2 is a perspective view showing a first lamp unit and a second lamp unit.
Figure 3:
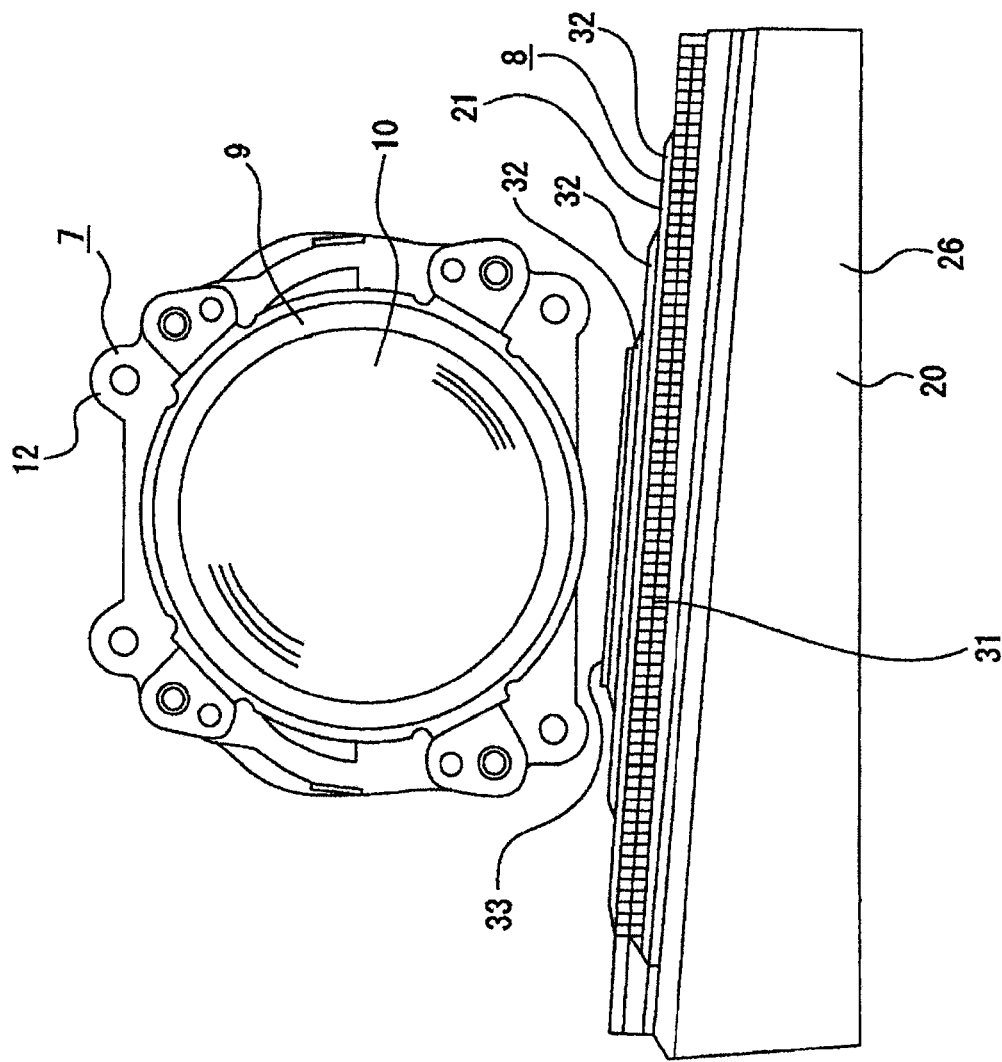
FIG. 3 is a front view showing the first lamp unit and the second lamp unit.

First and second lamp units 7 and 8 are disposed in the lamp chamber 5 so as to be spaced apart from each other, for example, in an up-down direction (see FIGS. 1 to 3). For example, a headlamp functioning as a headlight is provided as the first lamp unit 7. For example, a clearance lamp functioning as a sidelight is provided as the second lamp unit 8.

As shown in FIG. 1, the first lamp unit 7 includes a lens holder 9, a projection lens 10 that is mounted on the front end portion of the lens holder 9, a reflector 11 that is disposed on the rear side of the lens holder 9, a mounting plate 12 on which the lens holder 9 and the reflector 11 are mounted, and a headlamp light source 13 that is mounted on a rear end portion of the reflector 11.

The first lamp unit 7 is supported by the lamp housing 2 through an optical axis adjustment mechanism (not shown). Accordingly, the first lamp unit 7 is moved relative to the lamp housing 2 in an up-down direction or a left-right direction through the operation of the optical axis adjustment mechanism so as to perform the adjustment of an optical axis of the light emitted from the headlamp light source 13 (e.g., aiming adjustment or leveling adjustment).

Further, the first lamp unit 7 can swivel in a horizontal direction by a so-called swivel mechanism that makes the light emitted from the headlamp light source 13 follow a traveling direction of the vehicle.

The inner surface of the reflector 11 is formed as a reflecting surface 11a, and the rear end portion of the reflector is formed as a substantially cylindrical mounting portion 11b.

A light transmission hole 12a is formed at an upper portion of the mounting plate 12, and a portion of the mounting plate below the light transmission hole 12a is formed as a shade portion 12b. A rear end portion of the lens holder 9 and a front end portion of the reflector 11 are mounted on the mounting plate 12 in the front-rear direction.

The headlamp light source 13 is, for example, a discharge lamp, and light is emitted from a light emitting portion 15 that is provided in an outer pipe 14. The outer pipe 14 is held by a cap portion 16 that is disposed on the rear side thereof, and the cap portion 16 is mounted on the mounting portion 11b that is formed at the rear end portion of the reflector 11.

Meanwhile, the headlamp light source 13 is not limited to a discharge lamp, and may be other kinds of light source, such as a light-emitting diode (LED) or a halogen lamp.

A lighting device (not shown) is disposed in the lamp chamber 5 at the lower end portion of the lamp chamber. When a drive voltage is applied to the headlamp light source 13 from a drive circuit of the lighting device, light is emitted from the light emitting portion 15. The light emitted from the light emitting portion 15 is directed to the front side or is reflected by the reflecting surface 11a of the reflector 11, and is projected forward as irradiation light by the projection lens 10

Figure 4:
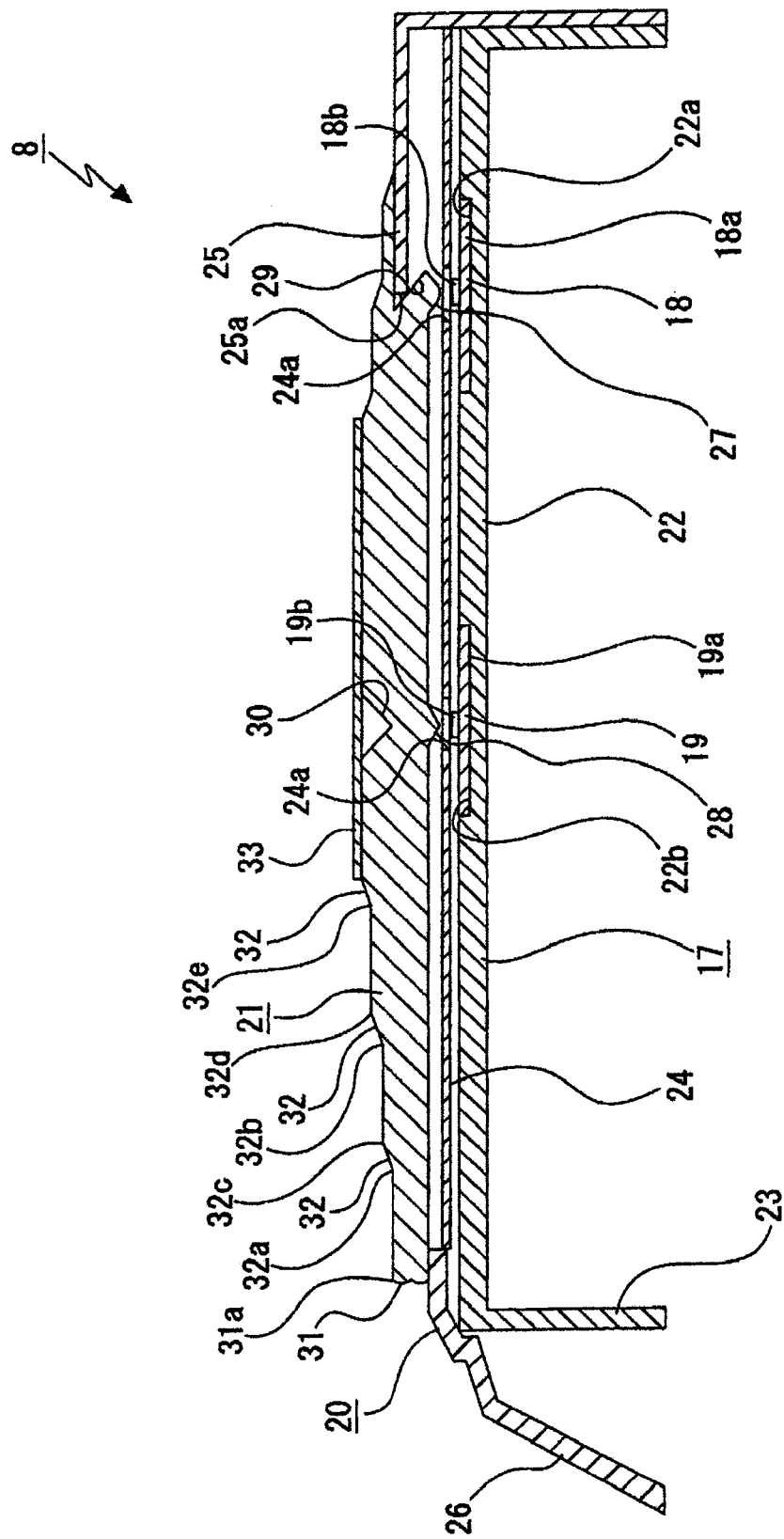
FIG. 4 is a sectional view showing the second lamp unit.

As shown in FIG. 4, the second lamp unit 8 includes a disposition base 17, first and second light source units 18 and 19 that are disposed on the disposition base 17, a mounting base 20 that is disposed so as to cover the disposition base 17, and a light guide body 21 that is mounted on the mounting base 20.

The disposition base 17 includes a disposition face 22 and a peripheral surface portion 23 that are integrally formed. The disposition face 22 faces the up-down direction, and the peripheral surface 23 protrudes downward from the outer peripheral portion of the disposition surface portion 22. Disposition recesses 22a and 22b, which are opened upward, are formed at the disposition surface portion 22. The disposition recess 22a is positioned near a rear end of the disposition surface portion 22, and the disposition recess 22b is positioned at a substantially central portion of the disposition surface portion 22.

The first and second light source units 18 and 19 are disposed and mounted in the disposition recesses 22a and 22b of the disposition base 17, respectively. The first light source unit 18 is formed of a first light source 18b that is mounted on a circuit substrate 18a, and the second light source unit 19 is formed of a second light source 19b that is mounted on a circuit substrate 19a. The circuit substrates 18a and 19a of the first and second light source units 18 and 19 are inserted and mounted in the disposition recesses 22a and 22b, respectively.

Light-emitting diodes (LEDs) are used as the first and second light sources 18b and 19b, respectively.

A light shielding plate 24, which faces the up-down direction, is disposed above the disposition surface portion 22 of the disposition base 17. Transmission holes 24a and 24a are formed at the light shielding plate 24 so as to be spaced apart from each other in the front-rear direction. The light shielding plate 24 is disposed above the disposition base 17 so that the transmission holes 24a and 24a are positioned immediately above the first and second light sources 18b and 18b, respectively.

The mounting base 20 includes a mounting surface portion 25 and a skirt portion 26 that are integrally formed. The mounting surface portion 25 faces the up-down direction, and the skirt portion 26 protrudes substantially downward from the outer peripheral portion of the mounting surface portion 25. A large disposition hole 25a is formed at the mounting surface portion 25. A portion of the light shielding plate 24 except for a rear end portion of the light shielding plate is disposed in the disposition hole 25a of the mounting surface portion 25.

The light guide body 21 is mounted on the mounting surface portion 25 of the mounting base 20. The light guide body 21 is formed substantially in the shape of a plate substantially facing the up-down direction, and is mounted on the mounting surface portion 25 so as to cover the disposition hole 25a of the mounting base 20 from above.

Conical protruding portions, which protrude downward, are formed at a rear end portion and the substantially central portion of the light guide body 21, respectively. The outer surface (lower surface) of the conical protruding portion, which is formed at the rear end portion of the light guide body, is formed as a first incident surface 27. The outer surface (lower surface) of the conical protruding portion, which is formed at the substantially central portion of the light guide body, is formed as a second incident surface 28.

An inclined surface, which is inclined obliquely upward, is formed immediately above the first incident surface 27 of the light guide body 21. The inclined surface is formed as a first reflecting surface 29.

A conical recess, which protrudes downward, is formed immediately above the second incident surface 28 of the light guide body 21. A surface, which forms the recess, is formed as a second reflecting surface 30.

A portion of the outer peripheral surface of the light guide body 21, which is continued from a substantially front side to the side (outside), is formed as a first emission surface 31. The first emission surface 31 is positioned along the inner surface of the cover 3. A plurality of continuous predetermined steps is formed on the first emission surface 31.

A plurality of annular stepped surfaces, of which the sizes from the central portion are different from one another, is formed on the upper surface of the light guide body 21. The stepped surfaces are formed as second emission surfaces 32 (see FIGS. 2 to 4). The second emission surfaces 32 are formed so as to obliquely face the upper front side. Embossing is performed or a plurality of continuous predetermined steps is formed on the second emission surfaces. The second emission surfaces 32 are formed above the first emission surface 31 at different positions in the up-down direction, and are positioned on the rear side of the first emission surface 31.

As shown in FIG. 4, among the second emission surfaces 32 for example, the height of a lower edge 32a of the second emission surface 32 that exists at the lowest position corresponds to the height of an upper edge 31a of the first emission surface 31, the height of a lower edge 32b of the second emission surface 32 that exists at the second lowest position corresponds to the height of an upper edge 32c of the second emission surface 32 that exists at the lowest position, and the height of a lower edge 32d of the second emission surface 32 that exists at the highest position corresponds to the height of an upper edge 32e of the second emission surface 32 that exists at the second lowest position.

A shield plate 33 is mounted on the upper surface of the light guide body 21 within the second emission surface 32 that exists at the highest position.

Figure 5:
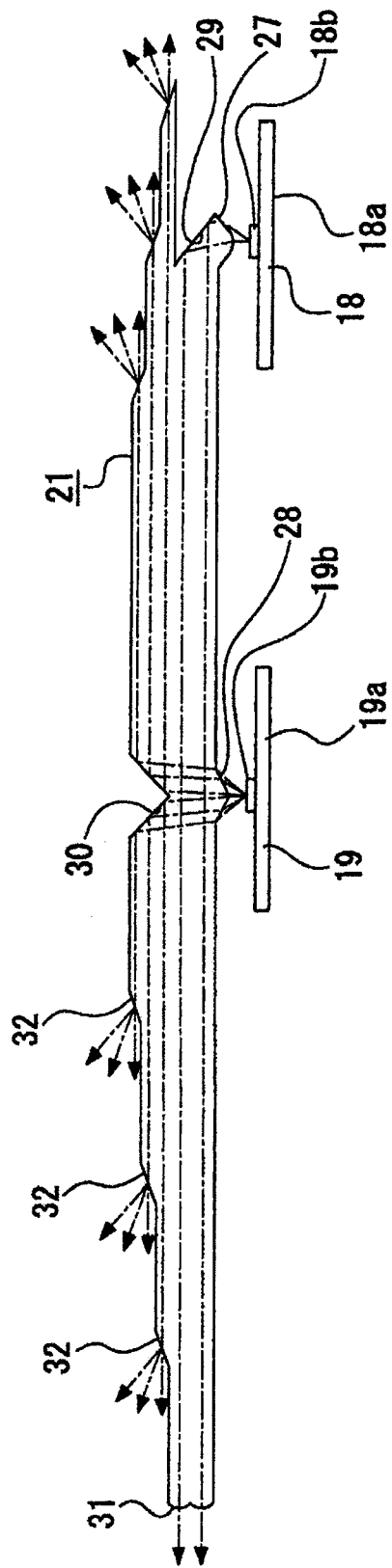
FIG. 5 is a view showing an optical path in the second lamp unit.

If light is emitted upward from the first light source 18b as shown in FIG. 5 in the second lamp unit 8 having the above-mentioned structure, the emitted light enters the light guide body 21 from the first incident surface 27, is internally reflected by the first reflecting surface 29, travels in the horizontal direction, and is emitted forward from the first emission surface 31.

Further, if light is emitted upward from the second light source 19b, the emitted light enters the light guide body 21 from the second incident surface 28, is internally reflected by the second reflecting surface 30, travels in the horizontal direction, and is emitted from the second emission surfaces 32. The light emitted from the second emission surfaces 32 is diffused, is directed to the front side, and is obliquely directed to the upper side. In this case, the light emitted from the second light source 19b is reflected by the second reflecting surface 30 so that almost all of the light is focused on the second emission surfaces 32. Accordingly, light locally having high brightness is emitted from the second emission surfaces 32.

When viewing the second lamp unit 8 on the front side of the second lamp unit, pedestrians may be in visual contact with both the light emitted forward from the first emission surface 31 and the light emitted forward from the second emission surfaces 32. Accordingly, a large light emitting area is secured by both the first emission surface 31 and the second emission surfaces 32, so that visibility to pedestrians is high and safety may be improved.

Further, when seeing the second lamp unit 8 on the upper side of the second lamp unit, pedestrians may be in visual contact with light that is obliquely directed to the upper side from the second emission surfaces 32 and locally has high brightness. Accordingly, visibility to pedestrians is high and safety may be improved.

Furthermore, since the second emission surfaces 32 are formed so as to be spaced apart from one another in the horizontal direction, pedestrians or the like may recognize the second lamp unit 8 as a structure that has a sense of depth.

In addition, the first and second reflecting surfaces 29 and 30 are formed at the second lamp unit 8, so that light is internally reflected inside the light guide body 21 and is emitted from the first emission surface 31 or the second emission surfaces 32. Accordingly, it is possible in some cases to efficiently guide light to a necessary position even by a small light source, so as to improve light use efficiency.

Moreover, the light emitted from the first and second light sources 18b and 19b is reflected by the first and second reflecting surfaces 29 and 30, respectively, travels in the horizontal direction, and is emitted from the first emission surface 31 and the second emission surfaces 32. Accordingly, it is possible in some cases to reduce the thickness of the light guide body 21, so as to reduce the sizes of the light guide body 21 and the second lamp unit 8 including the light guide body.

Meanwhile, an example where each of the second emission surfaces 32 is formed in an annular shape has been described above. However, the shape of each of the second emission surfaces 32 is not limited to the annular shape, and can be a circular arc shape or a curved shape that forms a part of the annular shape.

It is possible in some cases to emit light, which is emitted from the second light source 19b, over a wide range in a desired direction and improve light use efficiency by forming the second emission surfaces 32 in an annular shape or a shape that forms a part of an annular shape.

Further, it is possible in some cases to emit the light, which is emitted from the first light source 18b, in the shape of a band corresponding to the shape of the cover 3 and to further improve visibility to pedestrians by forming the light guide body 21 so that the first emission surface 31 is positioned along the inner surface of the cover 3 as described above.

Furthermore, in the vehicle lamp 1, a headlamp is provided as the first lamp unit 7 and a clearance lamp is provided as the second lamp unit 8. Accordingly, by the combination of the first and second lamp units, it is possible to dispose the first and second lamp units so that the light distribution of the first lamp unit 7 does not interfere with that of the second lamp unit 8. Moreover, it is possible in some cases to improve the use efficiency of the space of the lamp chamber 5 through the combination of the first and second lamp units.

Figure 6:
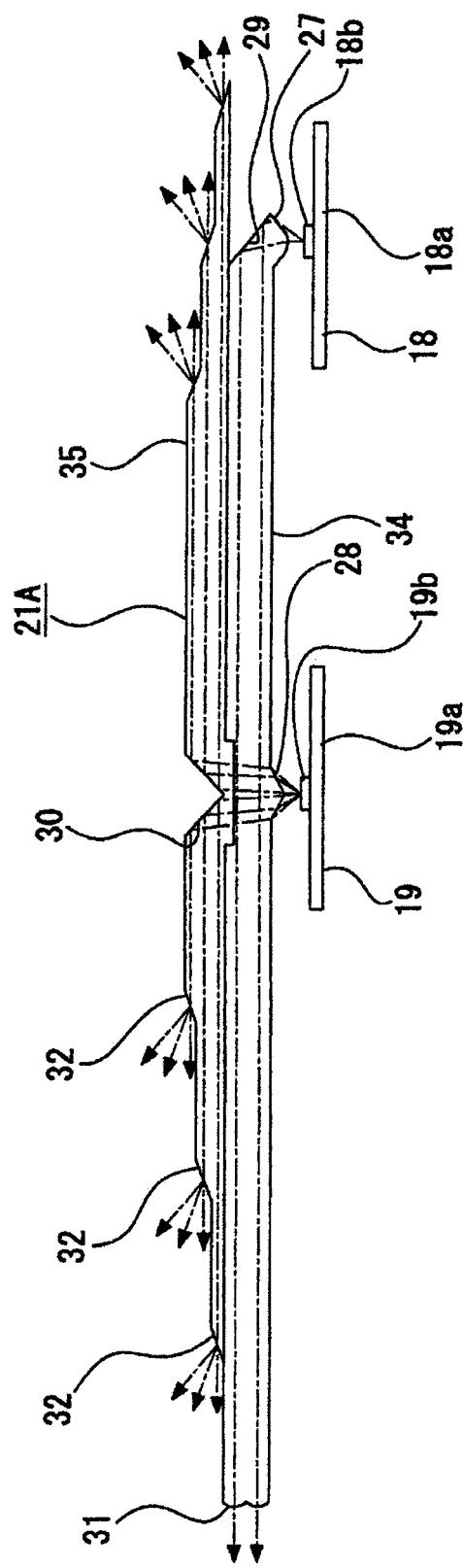
FIG. 6 is a sectional view showing a light guide body according to a first modified example.
Figure 7:
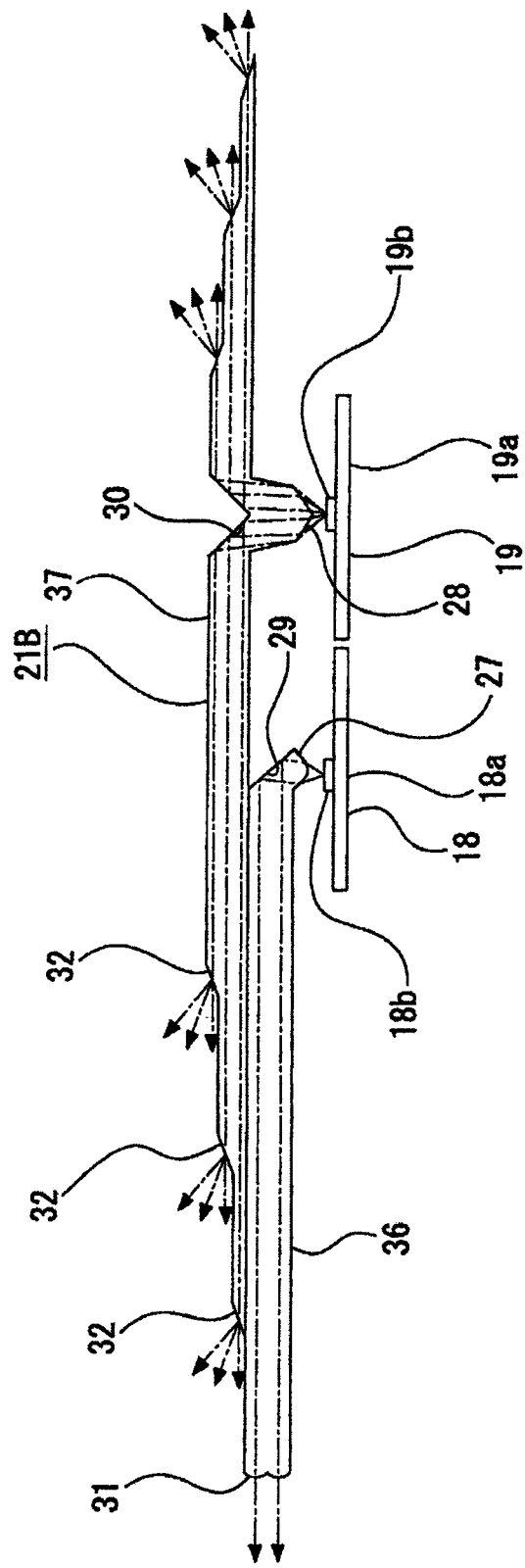
FIG. 7 is a sectional view showing a light guide body according to a second modified example.

Modifications of the light guide body are described below (see FIGS. 6 and 7). Each of light guide bodies 21A and 21B according to first and second modifications, which are to be described below, is formed of two members, which are joined to each other, in contrast to the light guide body 21. However, the basic structure of each of the light guide bodies 21A and 21B is the same as that of the light guide body 21. Accordingly, in the following description, only differences between the light guide bodies 21A and 21B and the light guide body 21 are described in detail below. The same portions as the light guide body 21 are denoted by the same reference numerals of the light guide body 21.

The light guide body 21A is formed by joining a first light guide member 34 to a second light guide member 35 in the up-down direction, and the first light guide member 34 is positioned below the second light guide member 35 (see FIG. 6).

A first incident surface 27, a second incident surface 28, a first reflecting surface 29, and a first emission surface 31 are formed at the first light guide member 34.

A second reflecting surface 30 and second emission surfaces 32 are formed at the second light guide member 35.

The light guide body 21B is formed by joining a first light guide member 36 to a second light guide member 37 in the up-down direction, and the first light guide member 36 is positioned below the second light guide member 37 (see FIG. 7). The length of the first light guide member 36 in the front-rear direction is substantially a half of the length of the second light guide member 37 in the front-rear direction, and the first light guide member is joined to a front end portion of the second light guide member 37.

The first incident surface 27, the first reflecting surface 29, and the first emission surface 31 are formed at the first light guide member 34.

The second incident surface 28, the second reflecting surface 30, and the second emission surfaces 32 are formed at the second light guide member 37.

Since the first incident surface 27 is positioned on the front side of the second incident surface 28, the first light source 18b is positioned on the front side of the second light source 19b so as to correspond to this.

Since each of light guide bodies 21A and 21B is formed of two members joined to each other as described above, the thickness of each of the two members is smaller than the light guide body that is integrally formed as a whole. Accordingly, it can be possible to reduce molding time.

Further, since the length of the first light guide member 36 of the light guide body 21B in the front-rear direction is substantially a half of the length of the second light guide member 37 in the front-rear direction, it is possible in some cases to form the first light guide member 36 with a small amount of material and to reduce manufacturing costs.

An example in which three second emission surfaces 32 are formed has been described above. However, the number of second emission surfaces 32 is not limited to three; the number of second emission surfaces can be arbitrary as long as a plurality of second emission surfaces is formed.

While the invention has been described with respect to a limited number of embodiments, those of ordinary skill in the art, having benefit of this disclosure, will appreciate that other implementations can be devised which do not depart from the scope of the invention as disclosed herein. Accordingly, other implementations are within the scope of the claims.

What is claimed is:

1. A lamp unit comprising:
   at least one light source arranged to emit light upward; and
   a light guide body including at least one incident surface where light emitted from the at least one light source enters, a first emission surface that emits light entering from the at least one incident surface in a horizontal direction, a plurality of second emission surfaces that emit light entering from the at least one incident surface in the horizontal direction and emit light entering from the incident surface to an upper side of the horizontal direction, and at least one reflecting surface which internally reflects the light emitted from the at least one light source in the horizontal direction and guides the reflected light to the first and second emission surfaces,
   wherein the plurality of second emission surfaces are above the first emission surface at different positions in an up-down direction, and are on a rear side of the first emission surface so as to be spaced apart from one another in the horizontal direction; and
   wherein the at least one incident surface is provided at a lower surface of the light guide body.

2. The lamp unit according to claim 1, comprising a first light source and a second light source as the at least one light source, and a first reflecting surface and one or more second reflecting surfaces as the at least on reflecting surface,
   wherein a first incident surface where light emitted from the first light source enters and a second incident surface where light emitted from the second light source enters are the at least on incident surface of the light guide body, and
   wherein the first reflecting surface internally reflects light, which enters the light guide body from the first incident surface, and guides the light to the first emission surface, and the one or more second reflecting surfaces internally reflect light, which enters from the second incident surface, and guide the light to the plurality of second emission surfaces.

3. The lamp unit according to claim 2 arranged such that
   the first reflecting surface is at a position on a rear side of the second reflecting surfaces,
   light emitted from the first light source is reflected in the horizontal direction by the first reflecting surface and is guided to the first emission surface, and
   light emitted from the second light source is reflected in the horizontal direction by the second reflecting surfaces and is guided to the plurality of second emission surfaces.

4. The lamp unit according to claim 2 wherein each of the plurality of second emission surfaces is in an annular shape having a center at the second reflecting surface, or in a shape that forms a part of an annular shape.

5. The lamp unit according to claim 2 wherein the light guide body includes a first light guide member that guides light emitted from the first light source and a second light guide member that guides light emitted from the second light source,
   the second incident surface is at the first light guide member or the second light guide member,
   the first incident surface, the first reflecting surface, and the first emission surface are at the first guide member, and
   the second reflecting surfaces and the plurality of second emission surfaces are at the second light guide member.

6. A vehicle lamp comprising:
   a lamp casing including a lamp housing of which one side is opened and a cover which closes an opening of the lamp housing;
   first lamp unit; and
   a second lamp unit positioned below the first lamp unit,
   wherein the first lamp unit and the second lamp unit are disposed in the lamp casing,
   wherein the second lamp unit includes:
      at least one light source arranged to emit light upward, and
      a light guide body including at least one incident surface where light emitted from the at least one light source enters, a first emission surface that emits light entering from the at least one incident surface in a horizontal direction, a plurality of second emission surfaces that emit light entering from the at least one incident surface in a horizontal direction and emit light entering from the at least one incident surface to an upper side of the horizontal direction, and at least one reflecting surface which internally reflects the light emitted from the at least one light source in the horizontal direction an guides the reflected light to the first and second emission surfaces,
   wherein the plurality of second emission surfaces are above the first emission surface at different positions in an up-down direction, and are on a rear side of the first emission surface so as to be spaced apart from one another in the horizontal direction; and
   wherein the at least one incident surface is provided at a lower surface of the light guide body.

7. The vehicle lamp according to claim 6 comprising a first light source and a second light source as the at least one light source, and a first reflecting surface and one or more second reflecting surfaces as the at least one reflecting surface,
   wherein a first incident surface where light emitted from the first light source enters and a second incident surface where light emitted from the second light source enters are the at least one incident surface of the light guide body, and
   wherein the first reflecting surface internally reflects light, which enters the light guide body from the first incident surface, and guides the light to the first emission surface, and the one or more second reflecting surfaces internally reflect light, which enters from the second incident surface, and guide the light to the plurality of second emission surfaces.

8. The vehicle lamp according to claim 7, wherein the light guide body is disposed so that the first emission surface is positioned along an inner surface of the cover.

9. The vehicle lamp according to claim 6, wherein the first lamp unit is a headlamp functioning its a headlight, and the second lamp unit is a clearance lamp functioning as a sidelight.

10. A lamp unit comprising:
    a first light source and a second light source each of which is arranged to emit light in a predetermined direction; and a light guide body including a first incident surface where light emitted from the first light source enters and a second incident surface where light emitted from the second light source enters, a first emission surface that emits light entering from the first incident surface in a horizontal direction, and a plurality of second emission surfaces that emit light entering from the second incident surface in the horizontal direction and emit light entering from the incident surface to an upper side of the horizontal direction, wherein the plurality of second emission surfaces are above the first emission surface at different positions in an up-down direction, and are on is rear side of the first emission surface so as to be spaced apart from one another in the horizontal direction, the light guide body includes a first reflecting surface for internally reflecting light, which enters the light guide body from the first incident surface, and for guiding the light to the first emission surface, and second reflecting surfaces for internally reflecting light, which enters from the second incident surface, and for guiding the light to the plurality of second emission surfaces, and the lamp unit is arranged such that:

the first reflecting surface is at a position on a rear side of the second reflecting surfaces, the light emitted from the first light source is reflected the horizontal direction by the first reflecting surface and is guided to the first emission surface, and light emitted from the second light source is reflected in the horizontal direction by the second reflecting surfaces and is guided to the plurality of second emission surfaces.

11. The lamp unit according to claim 10 wherein each of the plurality of second emission surfaces is in an annular shape having a center at the second reflecting surface, or in a shape that forms a part of an annular shape.

12. The lamp unit according to claim 10 wherein the light guide body includes a first light guide member that guides light emitted from the first light source and a second light guide member that guides light emitted from the second light source, the second incident surface is at the first light guide member or the second fight guide member, the first incident surface, the first reflecting surface, and the first emission surface are at the first light guide member, and the second reflecting surfaces and the plurality of second emission surfaces are at the second light guide member.

* * * * *